June 24, 1941.  G. H. JONES  2,246,885
PIPE JOINT TESTER
Filed Oct. 10, 1939
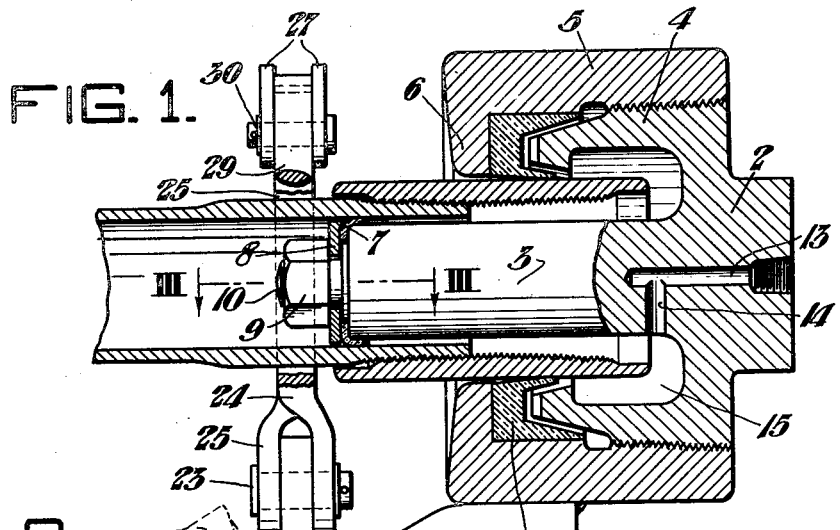
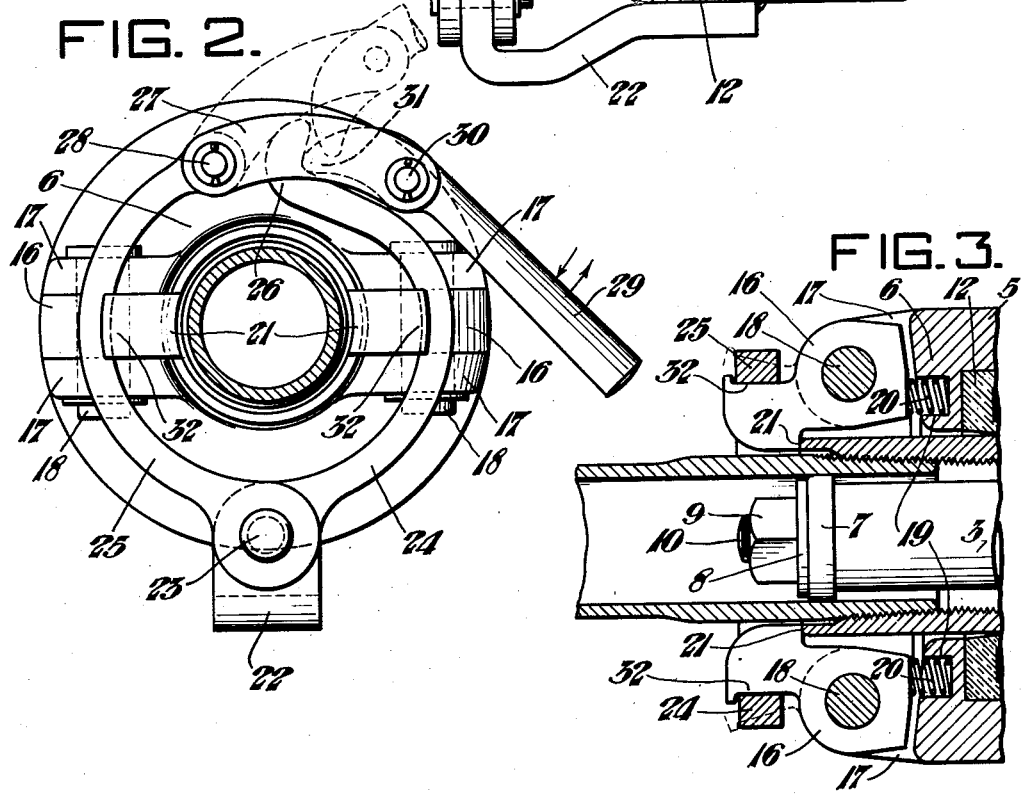
Inventor:
GEORGE H. JONES,
by: John E. Jackson
his Attorney Patented June 24, 1941

2,246,885

UNITED STATES PATENT OFFICE 2,246,885

PIPE JOINT TESTER

George H. Jones, Lorain, Ohio, assignor to National Tube Company, a corporation of New Jersey Application October 10, 1939, Serial No. 298,838

1 Claim. (Cl. 138—90)

This invention relates to the testing of pipe joints for leakage and, particularly, to an improved apparatus or device for performing such tests.

Various means have been suggested and used for testing pipe joints for leakage, either before shipment of the pipes at the particular point of manufacture, or at their point of use after shipment. It is, of course, desirable that such pipe joints be tested at the place of manufacture in order that any defects therein may be corrected by the manufacturer before shipment to the user. Some of these testing means have been entirely satisfactory in their use but were difficult and expensive to maintain and use, while others were not effective and did not provide a good test for the joint.

A high pressure fluid means is usually employed to test such joints and, in some cases, the ends of the pipe to be tested were sealed and the fluid under pressure introduced into the pipe so as to test the pipe as well as the joints at the ends thereof, but this was not satisfactory, in that, the force used at the ends of the pipe to effect a satisfactory seal oftentimes damaged these ends, especially if the ends of the pipe were threaded.

According to the present invention, it is proposed to test merely the joint by confining the fluid under pressure solely to the joint area, thereby requiring only a relatively small amount of testing fluid and providing a test which is quicker and less expensive.

It is one of the objects of the present invention to provide an improved, simple and inexpensive apparatus for testing pipe joints which can be easily and conveniently applied to the joint to be tested.

It is another object of the invention to provide an improved apparatus for testing pipe joints which reduces the time of testing to a minimum, and, at the same time, one that will effectively seal and test the joint at a minimum expense.

It is a further object of the present invention to provide an improved apparatus for testing pipe joints in which the testing fluid simultaneously acts to seal the joint and test the same.

Various other objects and advantages of this invention will be more apparent in the course of the following specification and will be particularly pointed out in the appended claim.

In the accompanying drawing there is shown, for the purpose of illustration, one embodiment which my invention may assume in practice.

In the drawing:

Figure 1 is a longitudinal section of the improved pipe joint tester of my invention;

Figure 2 is an elevation of the inner end thereof; and,

Figure 3 is a section taken on line III—III of Figure 1.

Referring more particularly to the drawing, the improved pipe joint tester of my invention comprises a body member 2 having a longitudinally extending cylindrical portion 3 and an enlarged exteriorly threaded annular cup or sleeve-like outer portion 4 arranged on one end thereof. There is arranged on the threaded portion 3 around the annular portion 4 of the body member 2, an interiorly threaded annular collar member 5 having an inwardly extending flanged portion 6 arranged on the inner end thereof. There is disposed on the end of the cylindrical portion 3 of the body member 2, a pliable annular sealing member or gasket 7, preferably made of leather or any other suitable pliable material, which is held thereon preferably by means of a washer 8 and a nut 9 disposed on a stud 10 arranged in the end of the cylindrical portion of the body member. There is arranged within the annular collar member 5, between the flanged portion 6 thereof and the inner end of the annular portion 4 of the body member 2, a pliable annular sealing member 12 having substantially a U-shaped cross section. This sealing member 12 is preferably made of rubber or some other suitable pliable material and is adapted to be disposed around the outside of the coupling on the end of the pipe.

There is arranged in the outer end of the body member 2 means such as passageways 13 and 14 communicating with a space 15 between the sealing members 7 and 12 for introducing the testing fluid into the space 15 and to the joint.

There is arranged preferably on the outer side of the flanged portion 6 of the collar member 5, a pair of latching members 16 which are oppositely disposed from each other, that is, one positioned on one side of the collar and the other on the opposite side thereof, and mounted on suitable bracket portions 17 carried by the flanged portion of the collar. Each of the latch members 16 is preferably rotatably mounted on a pin 18 carried by each of the bracket portions 17 and there is associated therewith, and preferably positioned in an opening 19 arranged in the flanged portion 6 of the collar member 5, a coil spring 20 which is adapted to cooperate with the latch member to normally hold it in a disengaged position. Each of these latch members has a lower hook portion 21 which is adapted to engage the inner end of the coupling on the end of the pipe to be tested.

Means for locking the joint tester on the end of the pipe to be tested is also preferably provided so as to safely retain the joint tester in position thereon in case of an unbalanced pressure at the time of testing. The means shown comprises an inwardly extending bracket arm 22 having one end thereof welded or otherwise secured preferably to the outer periphery of the annular collar 5. There is pivotally arranged at 23 on the inner end of the bracket member 22, a split ring consisting of two halves, 24 and 25. The opposite ends of the ring halves carry means for locking the ends thereof in engagement with each other. Such means preferably comprises a hook portion 26 arranged on the end of one of the ring halves and a toggle mechanism consisting of a lever 27 having one end thereof pivotally connected to the end of the other of the ring halves, as at 28, with a handle or actuating member 29 pivotally connected, as at 30, to the other end of the lever 27 and having a hook or cam portion 31 arranged on the end thereof which is adapted to cooperate with the hook portion 26 on the end of the other ring half.

The improved pipe tester of my invention is positioned on the pipe joint to be tested in the following manner:

The cylindrical portion 3 of the body member 2 is inserted through the end of the coupling into the end of the pipe so that the sealing member 7 on the inner end of the cylindrical portion is disposed opposite the inner wall of the pipe adjacent the end thereof and the sealing member 12 disposed opposite and around the outer wall of the coupling member on the end of the pipe. The assembly is then locked thereon by positioning the cam portion 31 of the actuating member 29 in engagement with the hook portion 26 of the opposite ring half and forcing the handle downwardly, thereby moving the ring halves toward each other. As the ring halves 24 and 25 move toward each other, they engage outwardly extending portions 32 of the latch members 16, thereby rotating them against the action of the coil springs 20 and positioning the hook portions 21 thereof against the inner end of the coupling and locking the assembly securely in position on the end of the pipe. A suitable testing fluid is then introduced to the joint through the passageways 13 and 14 into the space 15 and the testing fluid simultaneously forces the sealing member 7 on the inner end of the cylindrical portion 3 of the body member 2 against the inner wall of the pipe and forces one leg of the U-shaped sealing member 12 against the outer wall of the coupling, thereby sealing the joint and the joint is tested by continuous application of the testing fluid. After the joint is tested, the testing assembly or apparatus is removed from the end of the pipe by reversing the above operations.

While I have shown and described one embodiment of my invention, it will be understood that this embodiment is merely for the purpose of illustration and description and that various other forms may be devised within the scope of my invention, as defined in the appended claim.

I claim:

Apparatus for testing a joint between a pipe and a coupling comprising a body member having a small diameter portion which is adapted to extend into the pipe and coupling, an annular pliable sealing member arranged on said small diameter portion, an annular sleeve-like portion arranged on the outer end of said body member which is adapted to fit over and around the outer end of said coupling, an annular pliable sealing member carried by said annular sleeve-like portion, a plurality of pivoted latch members carried by said annular sleeve-like portion which are adapted to engage with the inner end of said coupling so as to securely hold the body member in position on the end of the pipe and coupling, releasable means carried by said sleeve-like portion for moving said latch members to their locked position over the end of said coupling and to retain the same in said locked position, and means for introducing a testing fluid to the joint whereby the testing fluid forces the sealing member on the small diameter portion outwardly tightly against the inner walls of the pipe and the sealing member arranged on said annular sleeve-like portion inwardly tightly against the outer surface of the coupling so as to securely seal the joint and to simultaneously test the same.

GEORGE H. JONES.